F. J. McKENNA.
POWER TRANSMISSION.
APPLICATION FILED JAN. 23, 1918.

1,291,047.

Patented Jan. 14, 1919.
2 SHEETS—SHEET 2.

Inventor
Felix J. McKenna
By his Attorney
C. D. Haskins

UNITED STATES PATENT OFFICE.

FELIX J. McKENNA, OF SEATTLE, WASHINGTON.

POWER TRANSMISSION.

1,291,047.      Specification of Letters Patent.      Patented Jan. 14, 1919.

Application filed January 23, 1918. Serial No. 213,800.

*To all whom it may concern:*

Be it known that I, FELIX J. McKENNA, citizen of the United States, residing at Seattle, in the county of King and State of Washington, have invented a certain new and useful Improvement in Power Transmissions, of which the following is a specification.

My invention relates to improvements in power transmissions that are adapted to transmit power through the frictional engagement of one rotatable element with another, and the object of my improvement is to provide a power transmission of the friction gear type that is relatively cheap and simple in its plan of construction and one that is reliable and efficient in its operation.

A further object of my invention is to provide a friction gear wherein the fiber and metallic elements are automatically adjustable with respect to each other and to provide means for varying the pressure of the fiber elements against the metallic elements.

My invention consists in the novel construction, adaptation and combination of parts of a friction gear as will be more clearly hereinafter described and claimed.

I accomplish these objects by devices illustrated in the following drawings, wherein—

Figure 1:
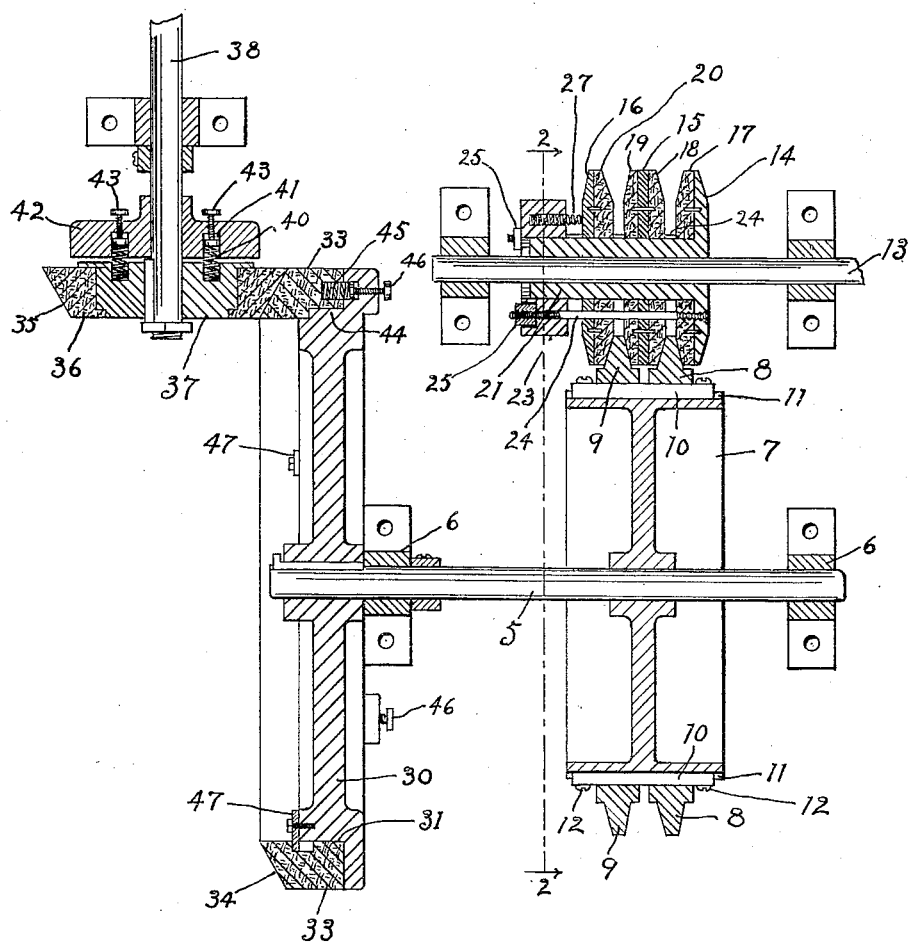
Figure 1 is a sectional view of a device constructed in accordance with my invention.
Figures 2, 3:
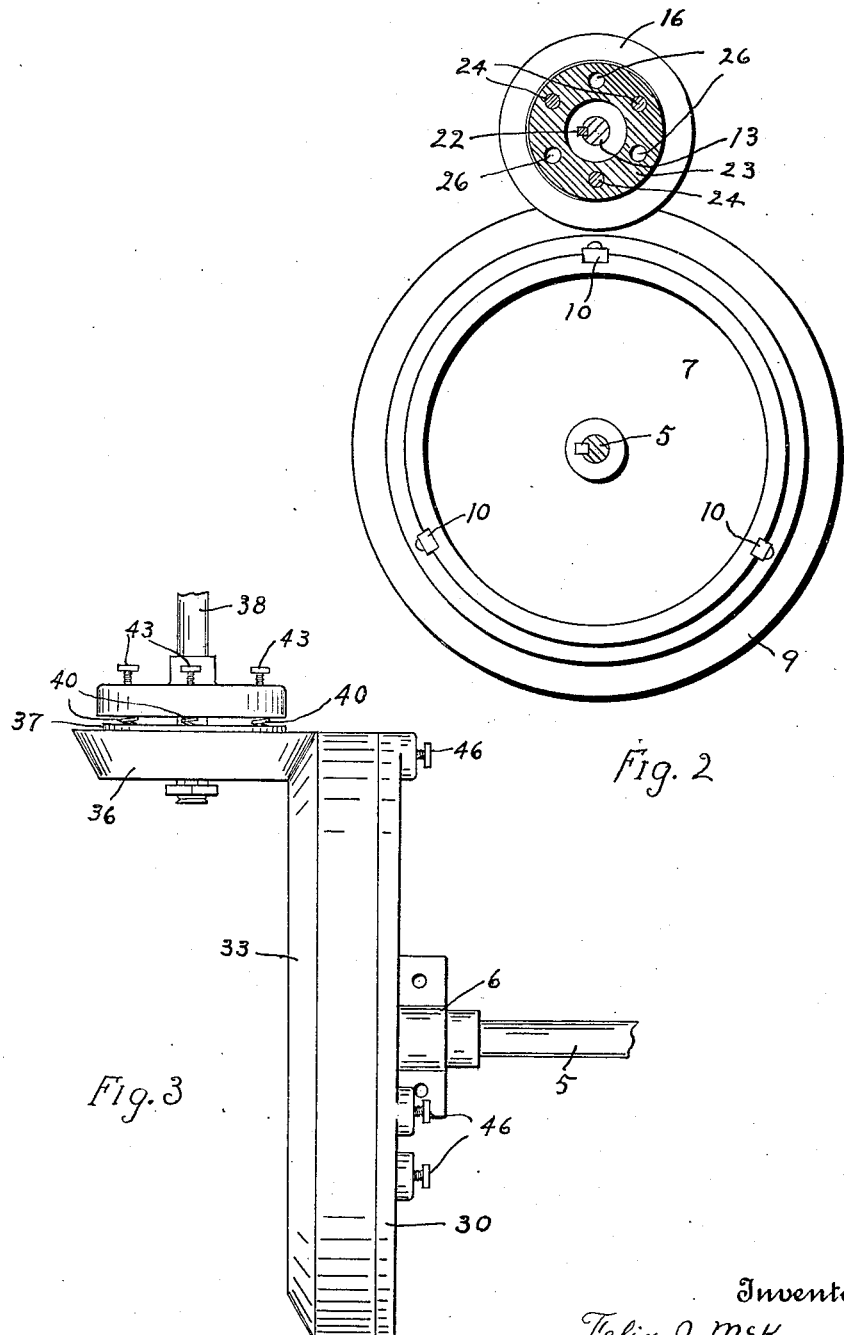
Fig. 2 is a view in cross-section on broken line 2, 2 of Fig. 1.
Fig. 3 is a view in elevation of a portion of the device.

Referring to the drawings throughout which like reference numerals indicate like parts, the numeral 5 designates a shaft that is journaled in bearings 6 and has a pulley 7 fixedly mounted thereon.

The pulley 7 is provided with two annular metallic friction members 8 and 9 that have inclined friction surfaces and present substantially the appearance of the frustum of a cone or pyramid when viewed in cross-section.

The members 8 and 9 are secured to the pulley 7 by keys 10 that extend crosswise of the periphery of the pulley and the keys 10 are set into slots 11 in the periphery of the pulley 7 and may be secured to the pulley by screws 12.

The friction members 8 and 9 are each adapted to fit the circumference of the pulley 7 loosely enough so that they may be moved sidewise thereon and are each provided with suitable slots that fit over the keys 10 and prevent the friction members 8 and 9 from being moved circumferentially with respect to the pulleys.

13 is a shaft that is disposed parallel with the shaft 5 and is provided with three circular metallic members 14, 15 and 16 to which are secured fiber disks 17, 18, 19 and 20 that are each beveled and adapted to engage with the metal friction members 8 and 9.

The outer metal disk 14 is formed integral with or otherwise rigidly connected to a sleeve 21 that is splined or rigidly secured on the shaft 13 by means of a key 22.

The members 15 and 16 are splined on the sleeve 21 so that they will rotate therewith and will be movable lengthwise thereon.

23 is a collar that is splined on the end of the sleeve 21 opposite to the member 14 and is connected with the member 14 by three bolts or rods 24 that pass through the members 15 and 16 and are adjustably connected with the member 23 by nuts 25.

The member 23 is recessed as at 26 for the reception of compression springs 27, preferably three in number, that normally bear against the outer surface of the disk 16 and serve to crowd the fiber friction members 17, 18, 19 and 20 into engagement with the metal friction members 8 and 9.

The pressure of the springs 27 may be varied by adjusting the nuts 25.

When the device is in operation and either the shaft 5 or the shaft 13 is driven it is obvious that the friction members on the driven shaft will coact with the friction members on the other shaft to rotate the same.

The pressure of the springs 27 against the disk 16 together with the tension of the rods 24 that is exerted on the disk 14 will tend to crowd all of the coöperating friction members together into close engagement.

The fiber friction members are movable lengthwise with respect to their shaft and the members 8 and 9 are movable sidewise on the pulley 7 so that all of such friction members will coact to automatically adjust their positions so that all of the friction surfaces will be maintained in working engagement all of the time.

It will be understood that any number of friction members similar to the members 8 and 9 may be used on the pulley 7 and that any number of fiber disks other than the number herein shown may be used on the shaft 13.

In connection with the friction gear just described I have shown another friction gear which may be used to transmit the rotary motion of the shaft 5 to a shaft disposed at right angles thereto.

This latter gear consists of a wheel 30 that may be keyed to the shaft 5 and is provided with a peripheral recess 31 within which is disposed an annular fiber friction member 33 that is provided with a beveled surface 34 adapted to engage with a correspondingly beveled surface 35 on an annular fiber member 36.

The fiber member 36 is secured to the periphery of a wheel 37 that is splined on a shaft 38 and adapted to be engaged by compression springs 40 that project within recesses 41 in a disk 42 that is fixedly mounted on the shaft 38, the springs 40 being adapted to be adjusted by screws 43 to cause them to exert a greater or less pressure on the wheel 37.

The fiber member 33 is prevented from rotating on the wheel 30 by lugs 44 that are formed on the wheel and project outwardly into suitable slots in the member 33.

The friction member 33 is normally engaged by compression springs 45 that are adjustable by means of screws 46 and tend to hold the members 33 outwardly into engagement with the member 36, the outward movement of the member 33 being limited by stops 47 that are secured to the wheel 30 and engage within the recesses 48 in the member 33.

In operation the member 33 will be held in frictional engagement with the member 36 by the force of compression of the springs 40 and 45.

In the device herein shown if the shaft 38 is driven it will communicate power through the friction members 36 and 33 to the shaft 5 which in turn will communicate power through the members 8 and 9 and friction disks 17, 18, 19 and 20 and associated parts to the shaft 13.

It is obvious that changes in the form of construction and arrangement of the various parts of my invention may be resorted to within the scope of the following claims.

What I claim is:

1. A friction gear comprising a pulley, an annular friction member encircling said pulley said friction members being movable sidewise on said pulley and fixed against circumferential movement thereon, friction disks mounted for rotation having beveled friction surfaces adapted to engage with the beveled surfaces of said friction members, rods extending through all of said disks, and springs coacting with said rods to crowd said disks together and into engagement with said friction members.

2. A device of the class described comprising a cylindrical member mounted for rotation on an axial shaft, annular beveled friction members encircling said cylindrical member said friction members being movable sidewise on said cylindrical member and being fixed against circumferential movement thereon, a shaft disposed at the side of said cylindrical member and parallel with the axis thereof, a sleeve secured on said shaft, a plurality of disks on said sleeve and rotatable therewith said disks having beveled friction surfaces adapted to engage said friction members, and springs for holding said disks in engagement with said friction members.

3. A device of the class described comprising a cylindrical member mounted on a shaft, two annular metallic members encircling said cylindrical member and movable sidewise thereof, said annular members having beveled friction surfaces, means for preventing circumferential movement of said annular members with respect to said cylindrical member, a shaft parallel with the axis of said cylindrical member, a sleeve secured to said shaft to rotate therewith, a disk fixedly secured to one end of said sleeve and having a beveled fiber friction member on one side thereof, two other disks mounted on said sleeve to rotate therewith and movable endwise thereof each of said disks having beveled fiber friction members thereon, a collar mounted on the end of said sleeve and movable lengthwise thereof, compression springs interposed between said collar and one of said disks and rods secured to said first named disk and adjustably connected with said collar whereby the force of said spring will urge said three disks together to cause them to frictionally engage the friction members on said cylindrical member.

4. A device of the class described comprising a cylindrical member mounted on a shaft and having transverse slots in the periphery thereof, keys secured in said slots and adapted to project outwardly beyond the periphery thereof, annular friction members encircling said cylindrical member said friction members having inclined friction surfaces on their sides that converge toward their outer peripheries and having transverse slots on their inner side that fit over said keys whereby the friction members may move sidewise on the cylindrical member but are prevented from moving circumferentially thereto, and other friction members yieldingly held together and having beveled surfaces to engage said first named friction members.

5. A device of the class described comprising a cylindrical member mounted on a shaft and having transverse slots in the periphery thereof, keys secured in said slots and adapted to project outwardly beyond the periphery thereof, two annular friction members encircling said cylindrical member, said friction members having inclined friction surfaces on their sides that converge toward their outer peripheries, and having transverse slots on their inner sides that fit over said keys whereby the friction members may move sidewise on the cylindrical member but are prevented from moving circumferentially thereon, a shaft parallel with the axis of said cylindrical member, a sleeve secured to said shaft to rotate therewith, a disk fixedly secured to one end of said sleeve and having a beveled fiber friction member on one side thereof, two other disks mounted on said sleeve and movable endwise thereof each of said disks having beveled fiber friction members thereon, a collar mounted on the end of said sleeve and movable lengthwise thereof, compression springs interposed between said collar and one of said disks and rods secured to said first named disk and adjustably connected with said collar whereby the force of said springs will urge said three disks together to cause them to engage frictionally said friction members on said cylindrical member.

6. A device of the class described comprising two shafts arranged at right angles to each other, a wheel fixedly mounted on one of said shafts, a beveled friction member on the peripheral portion of said wheel and movable in a direction at right angles to the plane of the wheel, a wheel splined on the other of said shafts, a beveled friction member on the periphery of said last named wheel and adapted to engage said first named friction member, a disk fixedly secured to said shaft adjacent said last named wheel, compression springs interposed between said wheel and said disk, and springs interposed between said first named friction member and said first named wheel.

In witness whereof I hereunto subscribe my name this 18th day of January, A. D. 1918.

FELIX J. McKENNA.

Copies of this patent may be obtained for five cents each, by addressing the "Commissioner of Patents, Washington, D. C."